United States Patent
Davis et al.

(10) Patent No.: US 8,127,581 B2
(45) Date of Patent: Mar. 6, 2012

(54) TURBINE BLADE TWIST ANGLE CORRECTION TOOLING

(75) Inventors: Ephraim C. Davis, No Richland Hills, TX (US); Bryan G. Parrette, Vernon, CT (US); Larry D. Cronin, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 920 days.

(21) Appl. No.: 12/082,896

(22) Filed: Apr. 15, 2008

(65) Prior Publication Data

US 2009/0255307 A1    Oct. 15, 2009

(51) Int. Cl.
*B21C 51/00* (2006.01)
*B23Q 3/00* (2006.01)
*B23P 19/04* (2006.01)
*B25B 27/14* (2006.01)

(52) U.S. Cl. ......... 72/31.03; 33/530; 269/291; 269/307; 269/315; 29/243; 29/244; 29/261; 29/281.1; 29/281.5; 29/283.5

(58) Field of Classification Search ............... 72/31.01, 72/31.03, 389.1, 479, 31.04, 298, 299; 33/530, 33/534; 269/291, 307, 315; 29/242, 243, 29/244, 261, 281.1, 281.5, 283.5, 889.1, 29/889.7
See application file for complete search history.

(56) References Cited

U.S. PATENT DOCUMENTS

| | | | |
|---|---|---|---|
| 1,968,837 A | * | 8/1934 | Kneip ............................. 33/530 |
| 3,653,128 A | | 4/1972 | Palmenberg |
| 3,683,657 A | * | 8/1972 | Davies ............................ 72/479 |
| 3,970,155 A | | 7/1976 | Otto |
| 4,146,967 A | | 4/1979 | Rohner et al. |
| 4,454,656 A | | 6/1984 | Arrigoni |
| 4,639,991 A | | 2/1987 | Sharon |
| 4,856,943 A | | 8/1989 | Nelson et al. |
| 4,866,828 A | | 9/1989 | Fraser |
| 4,908,782 A | | 3/1990 | Pekarek et al. |
| 4,951,390 A | | 8/1990 | Fraser et al. |
| 5,063,662 A | | 11/1991 | Porter et al. |
| 5,162,659 A | | 11/1992 | Diamond et al. |
| 5,625,958 A | | 5/1997 | DeCoursey et al. |
| 5,771,726 A | | 6/1998 | Bibby et al. |
| 6,209,216 B1 | | 4/2001 | Bear |

(Continued)

FOREIGN PATENT DOCUMENTS

| | | |
|---|---|---|
| EP | 0359585 A | 3/1990 |
| EP | 1310632 A | 5/2003 |
| JP | 60064737 A | 4/1985 |

OTHER PUBLICATIONS

Extended European Search Report of the European Patent Office in counterpart foreign application No. EP09250376 filed Feb. 13, 2009.

*Primary Examiner* — Teresa Ekiert
(74) *Attorney, Agent, or Firm* — Kinney & Lange, P.A.

(57) ABSTRACT

A tool for correcting the twist angle of a turbine blade includes an adaptor configured to engage a tip of the blade, a socket drive configured to engage the adaptor, a first handle connected to a first side of the socket drive, a second handle connected to a second side of the socket drive, and a torque gauge configured to measure a load applied to the blade.

18 Claims, 4 Drawing Sheets

U.S. PATENT DOCUMENTS

| | | |
|---|---|---|
| 6,370,752 B1 | 4/2002 | Anderson et al. |
| 6,792,655 B2 | 9/2004 | Wah |
| 6,959,572 B2 | 11/2005 | Lawrence et al. |
| 7,469,452 B2 | 12/2008 | Garrett |
| 2007/0084048 A1 | 4/2007 | Gosling et al. |
| 2007/0084050 A1 | 4/2007 | Davis et al. |
| 2007/0169860 A1 | 7/2007 | Groh |
| 2009/0000102 A1 | 1/2009 | Willis et al. |

* cited by examiner

TURBINE BLADE TWIST ANGLE CORRECTION TOOLING

STATEMENT OF GOVERNMENT INTEREST

This Government may have certain rights in this invention pursuant to Contract No. F33657-99-D-2051 awarded by the United States Air Force.

CROSS-REFERENCE TO RELATED APPLICATION(S)

The present application is related to the following copending applications filed on the same day as this application: "METHODS FOR CORRECTING TWIST ANGLE IN A GAS TURBINE ENGINE BLADE" by inventors Garrett Kernozicky, Ephraim C. Davis, Thomas P. Cap, and Paul Balko (U.S. application Ser. No. 12/082,864); and "METHOD FOR DEVELOPING A REPAIR PROCESS TO CORRECT A DEFORMED GAS TURBINE ENGINE COMPONENT" by inventors Garrett Kernozicky, Ephraim C. Davis, and Thomas P. Cap (U.S. application Ser. No. 12/082,865). All of these applications are incorporated herein by this reference.

BACKGROUND

The present invention relates to turbine blade repair procedures and tooling. In particular, the present invention relates to turbine blade twist angle correction tooling.

A gas turbine engine commonly includes a fan, a compressor, a combustor, a turbine, and an exhaust nozzle. During engine operation, working medium gases, for example air, are drawn into and compressed in the compressor. The compressed air is channeled to the combustor where fuel is added to the air and the air/fuel mixture is ignited. The products of combustion are discharged to the turbine section, which extracts work from these products to produce useful thrust to power, for example, an aircraft in flight.

The compressor and turbine commonly include alternating stages of rotor blades and stator vanes. Compressor and turbine blades and vanes often include complex, contoured airfoil geometries designed to optimally interact with the working medium gas passing through the engine. One common feature of airfoil geometries is the blade twist angle. The twist angle is the angular displacement of the airfoil about a spanwise axis, such as the stacking axis, from the root to the tip of the airfoil. During normal engine operation, the blade twist angle feature, which is a critical characteristic of gas turbine engine blades, decreases due to thermo-mechanical cycling and aerodynamic loading of the blades. The twist angle must be restored to the original manufactured condition during engine overhaul prior to returning the blade to service.

Turbine blade twist correction is commonly accomplished by clamping the blade root in a fixture and manually applying a load to the tip of the blade using, for example a wrench configured to clamp the blade tip. An operator twists the blade using the wrench, measures the blade twist angle, and repeats the twisting procedure until the correct twist angle is reached. Because the operator can only estimate how much force to apply each time, this approach often requires many iterations to achieve the desired twist angle. This results in a time-consuming, labor-intensive, and costly process. This approach can also result in over-twist due to applying excessive force.

Therefore, improved tools and methods for correcting blade twist angle are needed.

SUMMARY

The present invention includes a wrench for correcting the twist angle of a turbine blade, which wrench includes an adaptor configured to engage a tip of the blade, a socket drive configured to engage the adaptor, a first handle connected to a first side of the socket drive, a second handle connected to a second side of the socket drive, and a torque gauge configured to measure a load applied to the blade.

Embodiments of the present invention also include a repair apparatus for correcting the twist angle of a turbine blade, which apparatus includes a base plate, a fixture connected to the base plate and configured to engage the root of the blade, a twist angle gauge connected to the base plate and configured to measure the twist angle of the blade, and a wrench configured to apply a measured load to a tip of the blade.

DETAILED DESCRIPTION

Figure 1A:
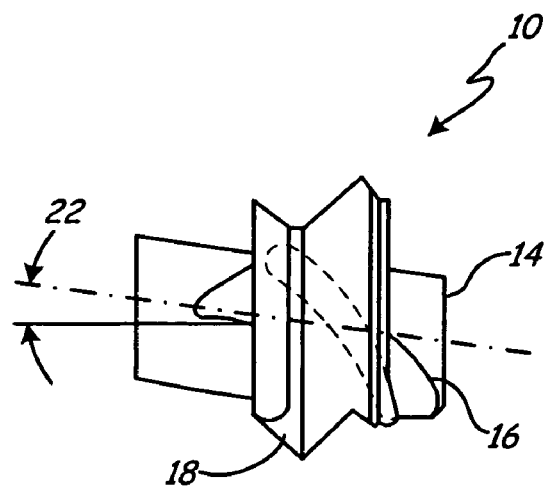
FIGS. 1A and 1B are top and side views respectively of a twisted gas turbine blade.
Figure 1B:
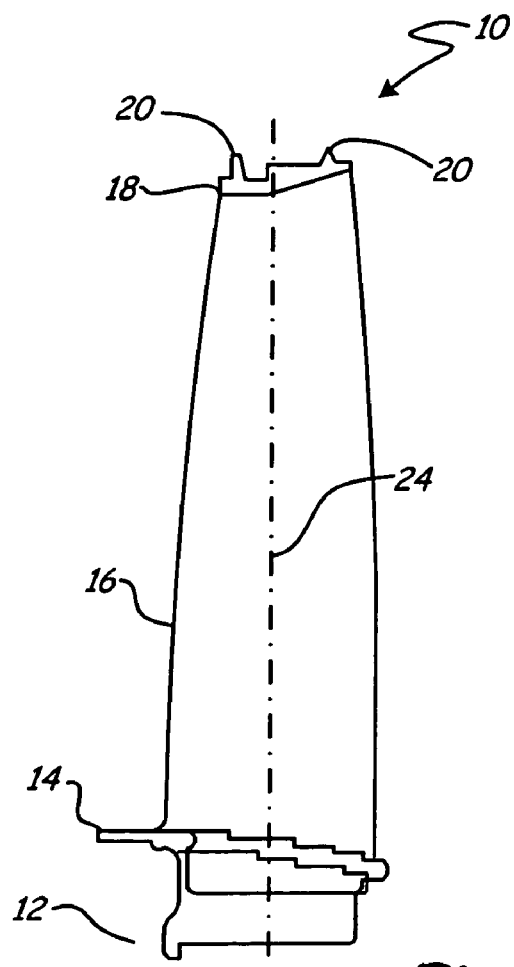

FIGS. 1A and 1B are top and side views respectively of twisted gas turbine blade 10, which includes root 12, platform 14, airfoil 16, shroud 18, and knife edges 20. In FIGS. 1A and 1B, blade 10 is a gas turbine blade including a twisted airfoil 16 which may be corrected using apparatuses according to the present invention. Blade 10 may be, for example, a shrouded high pressure turbine blade. Blade 10 includes root 12, which may include a dovetail or fir tree root 12 configured to be received in a slot in the rim of a rotor disc. Blade 10 also includes platform 14 integral with and radially outward of root 12. Airfoil 16 of blade 10 extends radially from platform 14 to shroud 18. Shroud 18 includes knife edges 20 designed to engage, for example, a stationary honeycomb seal arranged radially outward of turbine blade 10 mounted in the rim of the rotor disc. In general, twist angle 22 of blade 10 is equal to the angular displacement of airfoil 16 about a spanwise axis, such as stacking axis 24 of airfoil 16, between platform 14 and shroud 18. For example, in FIG. 1A, twist angle 22 is represented by the angle between the blade root center plane and a line perpendicular to knife edge 20. During normal engine operation, twist angle 22 of blade 10 may decrease due to thermo-mechanical cycling and aerodynamic loading on blade 10. In order to extend the useful life of blade 10, twist angle 22 may be restored to the original manufactured condition during engine overhaul prior to returning blade 10 to service.

Figure 2:
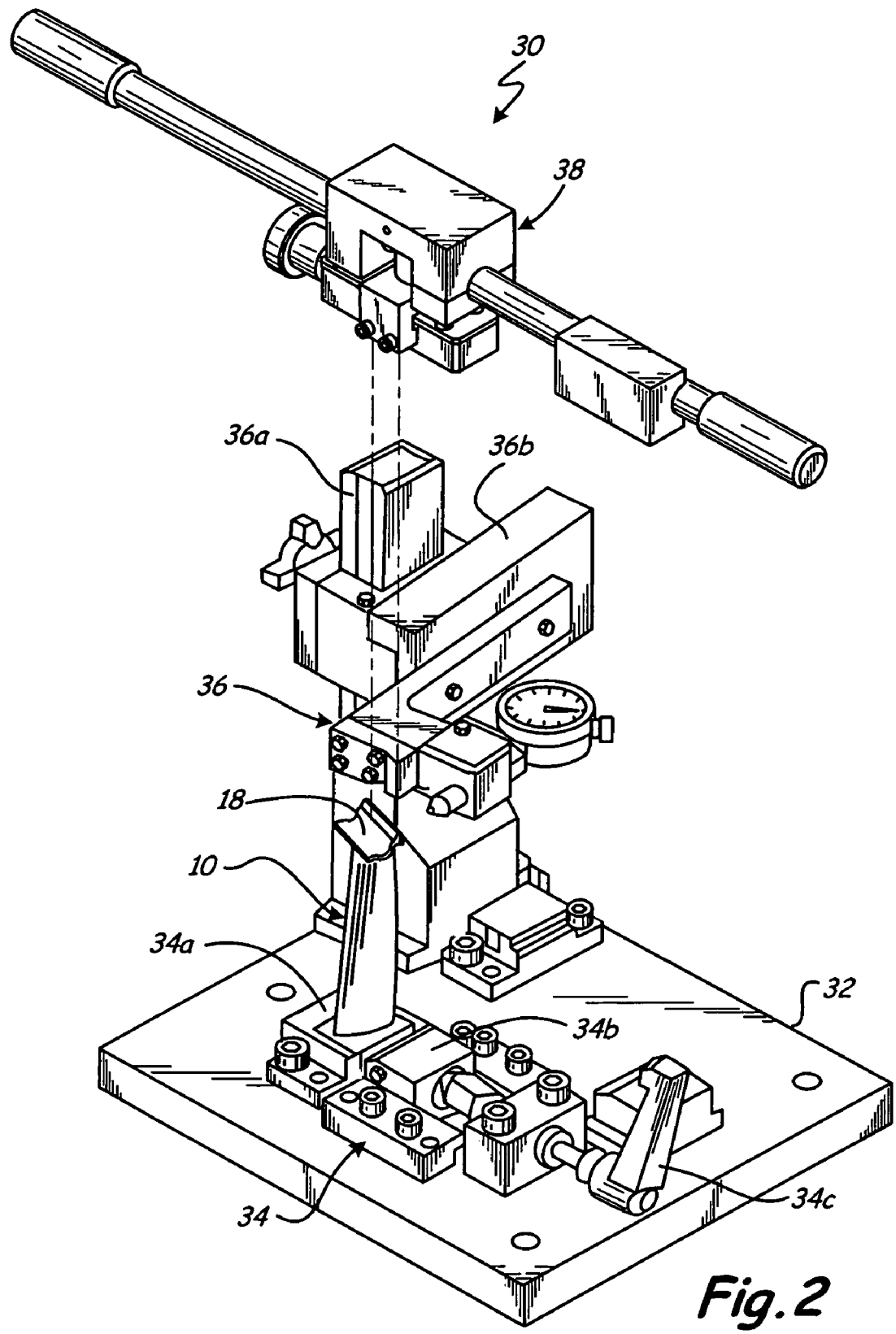
FIG. 2 is a perspective view of a repair apparatus for correcting the twist angle of the turbine blade shown in FIG. 1.

FIG. 2 is a perspective view of repair apparatus 30 according to the present invention for correcting twist angle 22 of blade 10, which apparatus 30 includes base plate 32, fixture 34, twist angle gauge 36, and wrench 38. Base plate 32 may be configured to mount to a table or bench. For example, toggle clamps may be mounted to the work bench and arranged to clamp the corners of base plate 32. Fixture 34 is connected to base plate 32 and configured to engage root 12 of blade 10. Fixture 34 may include, for example, blocks 34a, 34b and toggle clamp 34c. As shown in FIG. 2, blocks 34a, 34b may be configured to engage two sides of root 12 of blade 10 as toggle clamp 34c is engaged. Blocks 34a, 34b of fixture 34 may be adapted to engage varying root geometries, such as a fir tree root geometry (see FIG. 3B). Twist angle gauge 36 is connected to base plate 32 and configured to measure twist angle 22 of blade 10. Twist angle gauge 36 may be adjustably connected to, for example, gauge stand 36a and slide 36b. Gauge stand 36a may be configured to adjustably position gauge 36 vertically with respect to base plate 32 and slide 36b may be configured to move gauge 36 laterally into and out of engagement with blade 10. For example, in FIG. 2, slide 36b, and thereby gauge 36, is positioned away from, or, out of engagement with blade 10. Slide 36b may be moved toward blade 10 to cause twist angle gauge 36 to engage, for example, one or more portions of blade 10, such as contacting shroud 18 of blade 10 to measure twist angle 22. Wrench 38 is configured to engage shroud 18 of blade 10 and to apply a measured load to blade 10 to correct twist angle 22. For clarity, wrench 38 is exploded away from shroud 18 of blade 10 in FIG. 2.

The repair apparatus 30 shown in FIG. 2 may be used to correct twist angle 22 of blade 10. For example, root 12 of blade 10 may be clamped in fixture 34 connected to base plate 32. Twist angle gauge 36 may be moved into position to measure an initial twist angle of blade 10 by contacting shroud 18. Twist angle gauge 36 may then be disengaged from blade 10 and wrench 38 may be clamped to shroud 18 of blade 10. A measured load may be applied to wrench 38 to re-twist blade 10 to a corrected twist angle.

Figure 3A:
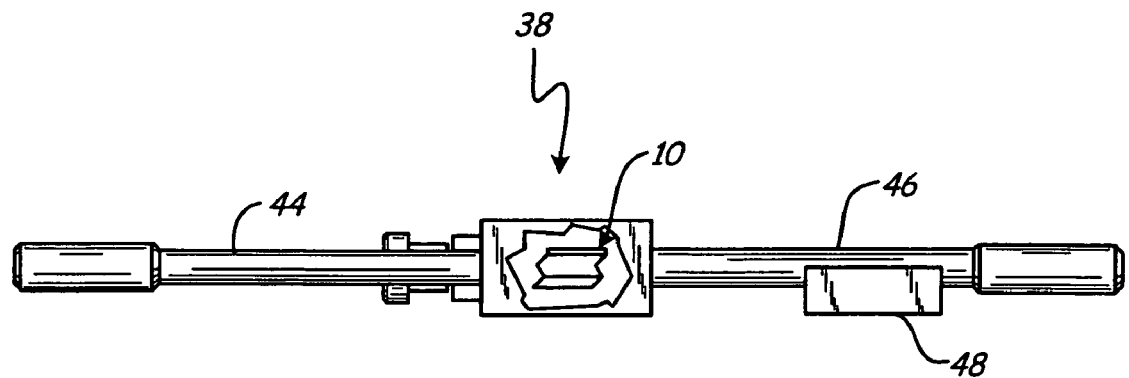
FIGS. 3A and 3B are top and front views respectively of the wrench shown in FIG. 2.
Figure 3B:
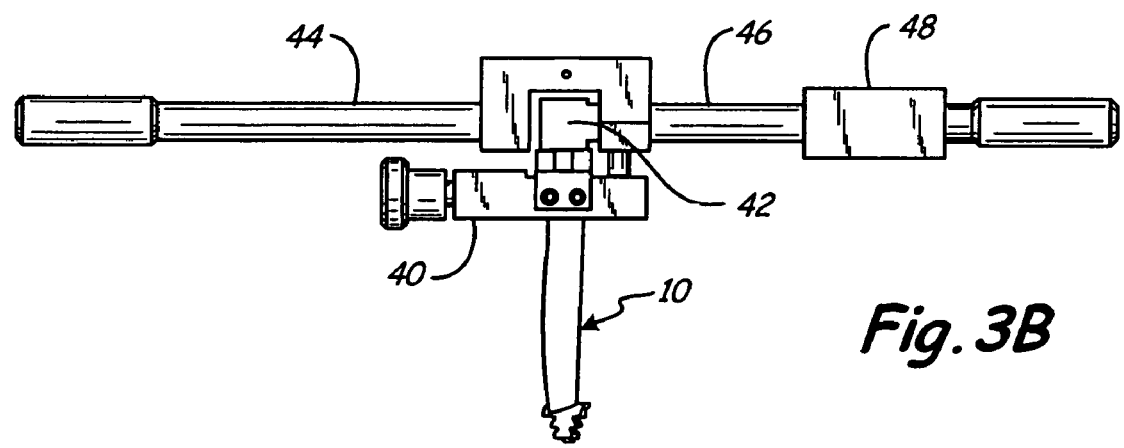

FIGS. 3A and 3B are top and front views respectively of wrench 38 engaging blade 10. Wrench 38 includes adaptor 40, socket drive 42, first handle 44, second handle 46, and torque gauge 48. First and second handles 44, 46 are connected to either side of socket drive 42. Socket drive 42 engages adaptor 40, which adapter 40 is configured to engage blade 10. Adaptor 40 may be configured in alternative embodiments of the present invention to engage turbine blades with varying tip configurations, such as shrouded and unshrouded blades and blades having squealer tips. In FIGS. 3A and 3B, adapter 40 engages shroud 18 of blade 10 by, for example, nesting shroud 18 into a pocket in adapter 40. Torque gauge 48 may be, for example, an electronic or electromechanical gauge configured to measure the load applied to blade 10 by wrench 38 during twist correction operations. Torque gauge 48 may be mounted to first handle 44 and may include an analog or electronic indicator configured to display the load applied to blade 10, thereby guarding against inadvertent over-twisting of blade 10.

Figure 4:
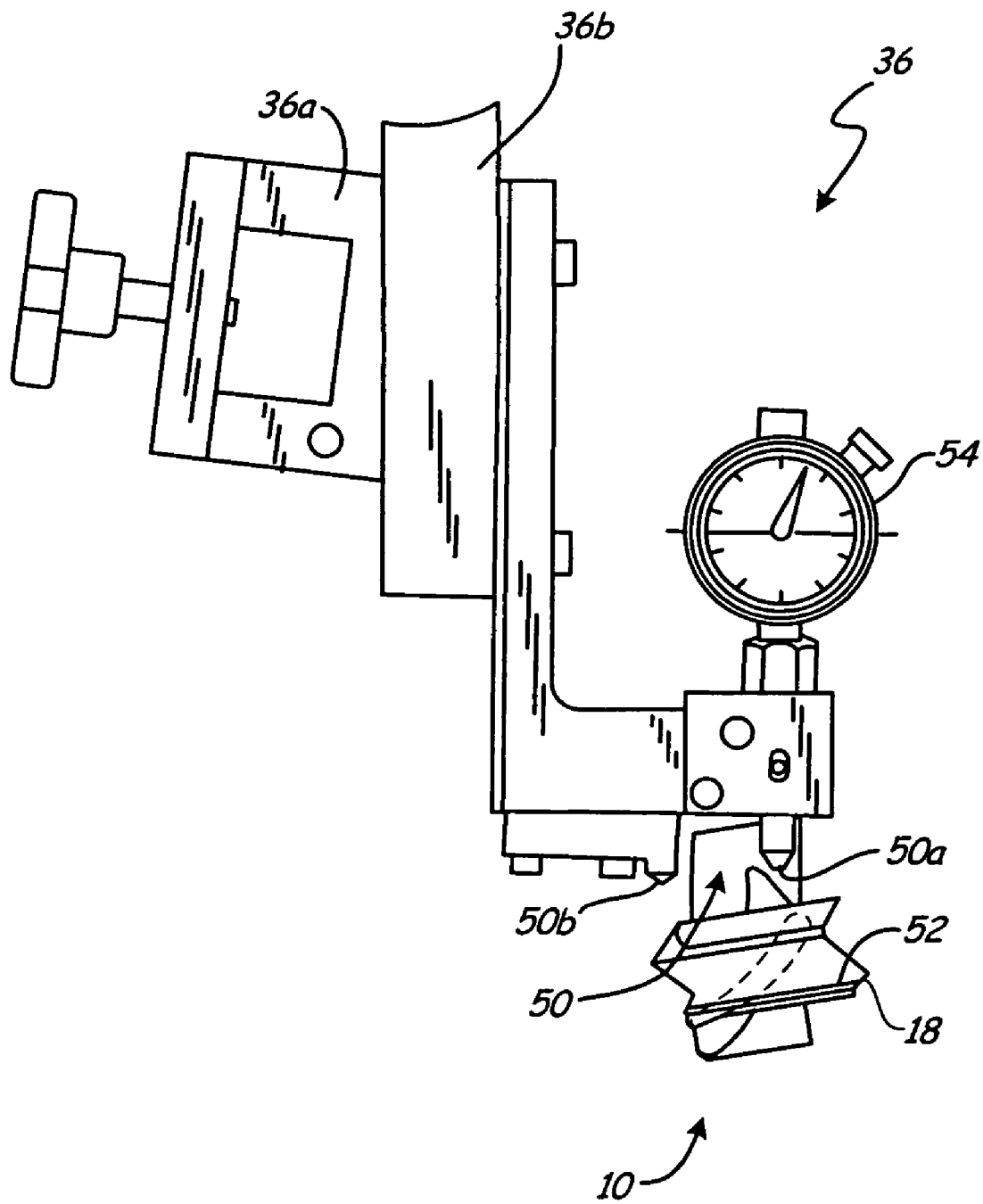
FIG. 4 is a top view of the twist angle gauge shown in FIG. 2.

FIG. 4 is a top view of twist angle gauge 36 positioned to engage blade 10, which gauge 36 includes jaws 50 having two probes 50a, 50b configured to contact shroud 18 of blade 10 at two points. In FIG. 4, gauge 36 is shown slightly out of engagement with shroud 18 of blade 10. Twist angle gauge 36 may be configured to extrapolate twist angle 22 of blade 10 by measuring the relative displacement of jaws 50 at probes 50a, 50b. For example, in FIG. 4, gauge 36 may be moved into position to engage shroud 18 of blade 10 by, for example, moving gauge 36 laterally via slide 36b. Probes 50a, 50b of jaws 50 may be configured, for example, to engage the forward face of the aft knife edge 52 of blade 10. As gauge 36 engages blade 10, probe 50a may be configured to be pushed by knife edge face 52 until probe 50b touches knife edge face 52. Gauge 36 extrapolates twist angle 22 of blade 10 from the deflection of probe 50a relative to probe 50b. Twist angle 22 of blade 10 may be displayed on dial 54 of gauge 36.

Devices and methods employing devices according to the present invention have several advantages over prior turbine blade twist correction tooling. Embodiments of the present invention provide an apparatus including a twist angle correction wrench configured to apply a measured load to correct the twist angle of turbine blades. Providing operators a device that indicates the load delivered to the blade under repair reduces the number of iterations, if any, necessary to repair the blade twist angle, and substantially reduces the risk of blade over-twisting due to applying excessive force. Turbine blade repairs employing embodiments of the present invention therefore reduce repair time and cost, and simultaneously improve repair quality.

Although the present invention has been described with reference to preferred embodiments, workers skilled in the art will recognize that changes may be made in form and detail without departing from the spirit and scope of the invention.

The invention claimed is:

1. A tool for correcting a twist angle of a turbine airfoil, the tool comprising:
   an adaptor configured to engage a tip of the airfoil;
   a drive member configured to engage the adaptor;
   a first handle connected to a first side of the drive member;
   a second handle connected to a second side of the drive member, the first and second handles configured to transmit a twisting load to the tip of the airfoil through the drive member and the adaptor; and
   a torque gauge mounted on the tool and configured to measure the twisting load applied to the airfoil by the tool.

2. The tool of claim 1, wherein the adaptor is configured to engage at least one of: a shrouded turbine airfoil and an unshrouded turbine airfoil.

3. The tool of claim 1, wherein the adaptor comprises a pocket configured to receive the tip of the airfoil.

4. The tool of claim 1, wherein the torque gauge comprises at least one of the following:
   an electronic indicator configured to display the twisting load applied to the airfoil; and
   an analog indicator configured to display the twisting load applied to the airfoil.

5. An apparatus for correcting a twist angle of a turbine airfoil, the apparatus comprising:
   a base plate;
   a fixture connected to the base plate and configured to engage the root of the airfoil;
   a twist angle gauge connected to the base plate and configured to measure the twist angle of the airfoil; and
   a tool configured to apply a measured load to a tip of the airfoil, wherein the tool comprises:
      an adaptor configured to engage a tip of the airfoil;
      a socket drive configured to engage the adaptor;
      a first handle connected to a first side of the socket drive;
      a second handle connected to a second side of the socket drive, the first and second handles configured to transmit a twisting load to the tip of the airfoil through the socket drive and the adaptor; and
      a torque gauge configured to measure the twisting load applied to the airfoil.

6. The apparatus of claim 5, wherein the fixture is configured to engage a turbine airfoil having a fir tree root geometry.

7. The apparatus of claim 5, wherein the twist angle gauge comprises:
   jaws configured to contact the airfoil at two or more points;
   wherein the twist angle gauge extrapolates the twist angle of the airfoil by measuring relative displacement of the jaws at the two or more contact points.

8. The apparatus of claim 7, wherein the jaws are configured to contact the airfoil at two or more points on the tip of the airfoil.

9. The apparatus of claim 7, wherein the jaws are configured to contact the airfoil at two or more points on a shroud of the airfoil.

10. The apparatus of claim 9, wherein the jaws are configured to contact the shroud at two or more points on a knife edge connected to the shroud.

11. The apparatus of claim 5, wherein the adaptor is configured to engage at least one of: a shrouded turbine airfoil and an unshrouded turbine airfoil.

12. The apparatus of claim 5, wherein the torque gauge comprises at least one of the following:
   an electronic indicator configured to display the twisting load applied to the airfoil; and
   an analog indicator configured to display the twisting load applied to the airfoil.

13. A apparatus for correcting a twist angle of a turbine airfoil, the apparatus comprising:
   a base plate;
   a fixture connected to the base plate and configured to engage the root of the airfoil;
   a twist angle gauge connected to the base plate and configured to measure the twist angle of the airfoil; and
   a tool comprising:
      an adaptor configured to engage a tip of the airfoil;
      a socket drive configured to engage the adaptor;
      a first handle connected to a first side of the socket drive;
      a second handle connected to a second side of the socket drive, the first and second handles configured to transmit a twisting load to the tip of the airfoil through the socket drive and the adaptor; and
      a torque gauge configured to measure the twisting load applied to the airfoil.

14. The apparatus of claim 13, wherein the adaptor is configured to engage a shrouded turbine airfoil.

15. The apparatus of claim 13, wherein the twist angle gauge comprises:
   jaws configured to contact the airfoil at two or more points;
      wherein the twist angle gauge extrapolates the twist angle of the airfoil by measuring relative displacement of the jaws at the two or more contact points.

16. The apparatus of claim 15, wherein the jaws are configured to contact the turbine airfoil at two or more points.

17. The apparatus of claim 13, wherein the jaws are configured to contact the airfoil at two or more points on a shroud of the airfoil.

18. The apparatus of claim 17, wherein the jaws are configured to contact the shroud at two or more points on a knife edge connected to the shroud.

* * * * *

UNITED STATES PATENT AND TRADEMARK OFFICE
CERTIFICATE OF CORRECTION

| | | |
|---|---|---|
| PATENT NO. | : 8,127,581 B2 | Page 1 of 1 |
| APPLICATION NO. | : 12/082896 | |
| DATED | : March 6, 2012 | |
| INVENTOR(S) | : Ephraim C. Davis, Bryan G. Parrette and Larry D. Cronin | |

It is certified that error appears in the above-identified patent and that said Letters Patent is hereby corrected as shown below:

Col. 2, Line 67
  Delete "comers"
  Insert --corners--

Signed and Sealed this
First Day of May, 2012

David J. Kappos
*Director of the United States Patent and Trademark Office*